United States Patent
Goldman

(10) Patent No.: US 11,268,625 B2
(45) Date of Patent: Mar. 8, 2022

(54) VALVE ACTUATORS PRINCIPALLY FOR WATER-CIRCULATION SYSTEMS OF SWIMMING POOLS OR SPAS

(71) Applicant: ZODIAC POOL SYSTEMS LLC, Carlsbad, CA (US)

(72) Inventor: David Goldman, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

(21) Appl. No.: 16/529,234

(22) Filed: Aug. 1, 2019

(65) Prior Publication Data

US 2020/0041033 A1 Feb. 6, 2020

Related U.S. Application Data

(60) Provisional application No. 62/713,069, filed on Aug. 1, 2018.

(51) Int. Cl.
| | |
|---|---|
| *F16K 31/05* | (2006.01) |
| *F16K 31/60* | (2006.01) |
| *F16K 31/04* | (2006.01) |
| *F16K 31/53* | (2006.01) |
| *E04H 4/12* | (2006.01) |

(52) U.S. Cl.
CPC ......... *F16K 31/055* (2013.01); *E04H 4/1209* (2013.01); *F16K 31/043* (2013.01); *F16K 31/046* (2013.01); *F16K 31/05* (2013.01); *F16K 31/607* (2013.01); *F16K 31/53* (2013.01);
(Continued)

(58) Field of Classification Search
CPC ......... Y10T 137/8275; Y10T 137/8292; Y10T 137/8309; F16K 37/0008; F16K 37/0016; F16K 31/055; F16K 31/05; F16K 37/0041; F16K 31/043
See application file for complete search history.

(56) References Cited

U.S. PATENT DOCUMENTS

| | | | | |
|---|---|---|---|---|
| 4,647,007 A | * | 3/1987 | Bajka | F16K 31/05 251/129.03 |
| 5,059,879 A | * | 10/1991 | Watanabe | G05B 19/23 318/603 |

(Continued)

FOREIGN PATENT DOCUMENTS

| | | |
|---|---|---|
| EP | 3306151 | 4/2018 |
| WO | 2006118361 | 11/2006 |

(Continued)

OTHER PUBLICATIONS

PCT/US2019/044667, "International Search Report and Written Opinion", dated Oct. 23, 2019, 14 pages.
(Continued)

*Primary Examiner* — Atif H Chaudry
(74) *Attorney, Agent, or Firm* — Kilpatrick Townsend & Stockton LLP

(57) ABSTRACT

Multi-position valve actuators principally for water-circulation systems of pools and spas are detailed. At least some actuators may indicate position of an associated valve in a non-electronic manner, as by using a handle visible externally of the actuator and directly or indirectly mechanically coupled to the valve so as to move therewith. Hence, even if power to an actuator is disrupted, positioning of the valve may be determined by viewing the handle.

12 Claims, 4 Drawing Sheets

(52) U.S. Cl.
CPC .... *Y10T 137/8275* (2015.04); *Y10T 137/8292* (2015.04); *Y10T 137/8309* (2015.04)

(56) References Cited

U.S. PATENT DOCUMENTS

| | | | |
|---|---|---|---|
| 5,630,398 A * | 5/1997 | Gant | F02M 41/06 |
| | | | 123/450 |
| 10,041,265 B2 | 8/2018 | Uy et al. | |
| 2001/0035510 A1* | 11/2001 | Oh | F16K 31/535 |
| | | | 251/129.03 |
| 2007/0289635 A1 | 12/2007 | Ghazarian et al. | |
| 2010/0308241 A1 | 12/2010 | Doyle et al. | |
| 2014/0264111 A1 | 9/2014 | Porter et al. | |
| 2016/0238668 A1* | 8/2016 | Cordray | F16K 37/0083 |
| 2017/0122453 A1 | 5/2017 | Ben Old | |
| 2017/0268209 A1 | 9/2017 | Guidish et al. | |
| 2017/0356553 A1* | 12/2017 | Cassel | F16K 31/043 |

FOREIGN PATENT DOCUMENTS

| | | |
|---|---|---|
| WO | 2014077849 | 5/2014 |
| WO | 2015038148 | 3/2015 |

OTHER PUBLICATIONS

International Application No. PCT/US2019/044667, International Preliminary Report on Patentability dated Feb. 11, 2021, 10 pages.

* cited by examiner

VALVE ACTUATORS PRINCIPALLY FOR WATER-CIRCULATION SYSTEMS OF SWIMMING POOLS OR SPAS

CROSS-REFERENCE TO RELATED APPLICATION

This application claims the benefit of and priority to U.S. Provisional Patent Application Ser. No. 62/713,069, filed Aug. 1, 2018, and having the same title as appears above, the entire contents of which application are hereby incorporated herein by this reference.

FIELD OF THE INVENTION

This invention relates to actuators and more particularly, although not necessarily exclusively, to multi-position actuators not requiring connection to a power center and including means for indicating valve positioning even when power to the actuators is absent.

BACKGROUND OF THE INVENTION

U.S. Pat. No. 10,041,265 to Uy, et al., describes multi-position valve actuators for swimming pools and spas. An exemplary actuator may form part of a system also including a controller, a power center controller, and a supply powering either or both of the controllers. Commercial versions of the actuator lack any on-board power supply, instead typically receiving operating power directly or indirectly from the power center controller. These commercial versions also lack any external handle as well as any non-electronic means for indicating the position of the associated valve or allowing manual override of that position.

U.S. Patent Application Publication No. 2010/0308241 of Doyle, et al., discloses another valve actuator "as a component of a pool or spa plumbed water line system." See Doyle, p. 1, ¶0003. Illumination of light-emitting diodes (LEDs) indicates the position of the associated valve. See id., ¶0012. Hence, if the LEDs lack power, no indication of valve position is available. The contents of both the Uy patent and the Doyle application are incorporated herein in their entireties by this reference.

SUMMARY OF THE INVENTION

The present invention supplies additional multi-position valve actuators principally for water-circulation systems of pools and spas. At least some actuators consistent with the present invention provide non-electronic means for indicating position of an associated valve. One such means may be a handle visible externally of the actuator and directly or indirectly mechanically coupled to the valve so as to move therewith. Hence, even if power to an actuator is disrupted, positioning of the valve may be determined by viewing the handle.

Including an externally-accessible handle as part of the present actuators also may permit manual override of the electronic positioning system of an actuator. Stated differently, a person desiring to change position of the valve may do so manually by moving the handle. Such manual operation may be especially valuable when power to the actuator is disrupted but may occur whether or not the actuator is receiving electrical power.

Most conventional actuators operate on 24V AC as supplied by a power center, with a dual-pole relay within the power center supplying voltage to a motor of an actuator to drive a motor in one direction or another. The power center itself typically contains a relatively large, central step-down transformer receiving ~120V AC from an electrical main and outputting 24V AC to multiple devices, including one or more actuators. Nowadays, however, need for a large, centralized power center is diminishing, concurrently reducing need for a large, centralized transformer. Accordingly, actuators of the present invention may include on-board transformers, batteries, or other means for being powered independently of a conventional power center.

Actuators of the present invention further may be controlled electronically. Wireless, two-way communication with a controller may occur; alternatively or additionally, wired communication (as, for example, using RS-485 protocol) may occur. Housings of at least some versions of the present actuators may include transformers, as noted above, as well as any internal electronics. Means for sensing a current valve position and adjusting it also may be included within the housings. Housings additionally may be plumbed in paths of circulating water (so as to redirect some or all of the water using the valves) and advantageously may include at least one externally-operable handle.

Moreover, some versions of the innovative actuators may include an encoder assembly. Such an assembly may track the position of the handle, and therefore the position of the associated valve, at all times—including when the handle is moved manually. One implementation of the assembly comprises an encoder gear and an encoder drive gear, with the latter maintaining contact with the former regardless of the position of an associated shaft.

DETAILED DESCRIPTION

Figure 1:
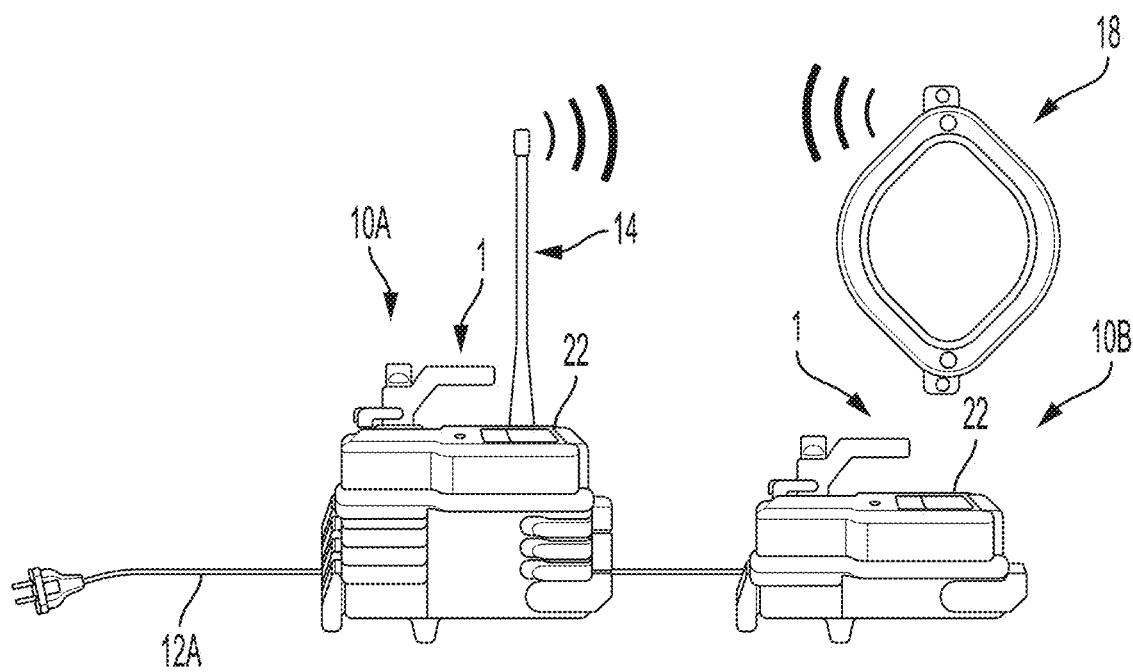
FIGS. 1-4 illustrate exemplary connections of valve actuators not requiring connection to a power center and including means for indicating valve positioning even when power to the actuators is absent.

FIGS. 1-4 illustrate sample connections of valve actuators, each including an external handle 1. In FIG. 1, two actuators 10A and 10B may be connected (either in parallel or serially) directly to mains power via cord 12A, thus not necessarily requiring connection to any power center. (At least) one of the actuators 10A also is shown as including an antenna 14 permitting direct or indirect wireless communication with a controller 18.

Figure 2:
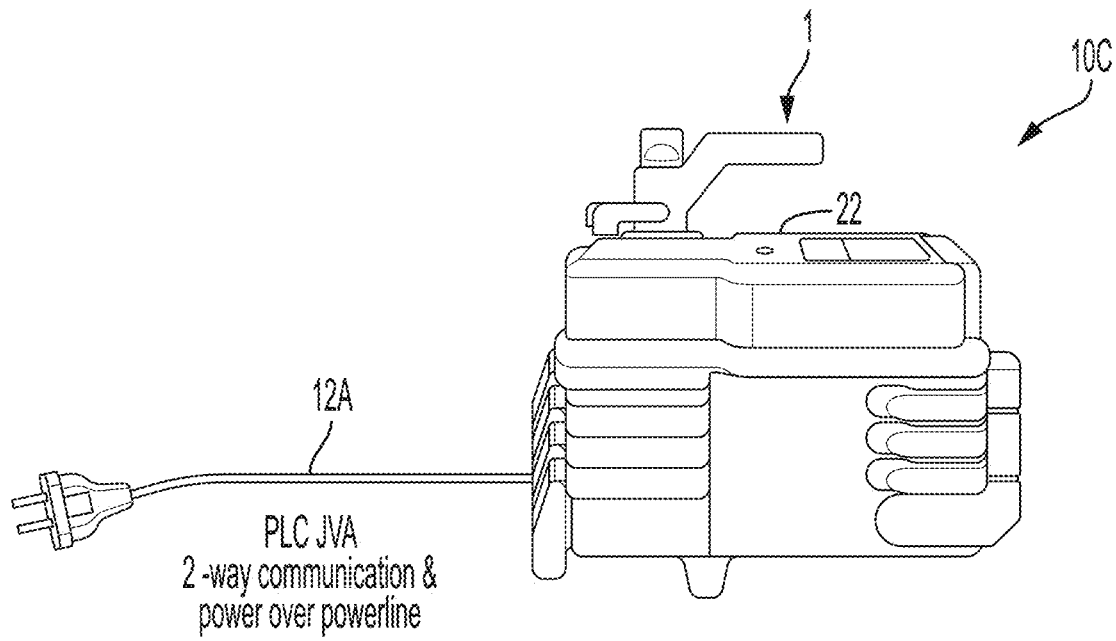

FIG. 2 illustrates an actuator 10C again connected to mains power via cord 12A. Cord 12A also may supply data signals, however. In this manner, actuator 10C may communicate with a remote controller via cord 12A without need for an antenna.

Figure 3:
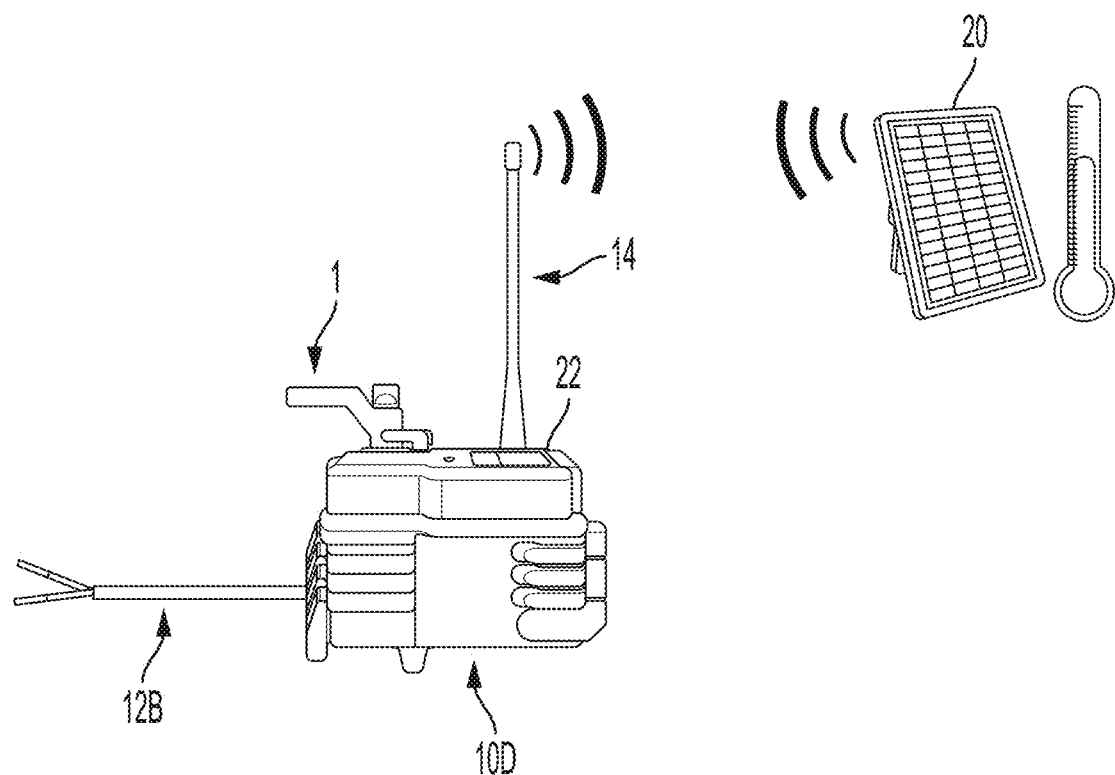

In FIG. 3, actuator 10D is depicted communicating wirelessly via antenna 14 with an external device 20 (e.g. a solar roof temperature sensor). Thus, actuator 10D may receive input not only from a controller, but from other devices as well. Cord 12B may supply electrical power to actuator 10D from any suitable source.

Figure 4:
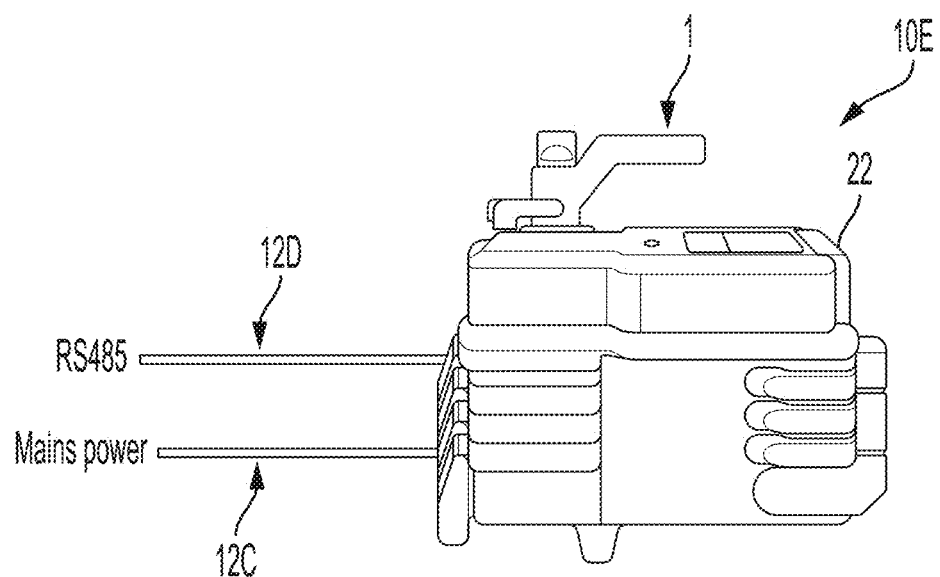
Figure 6:
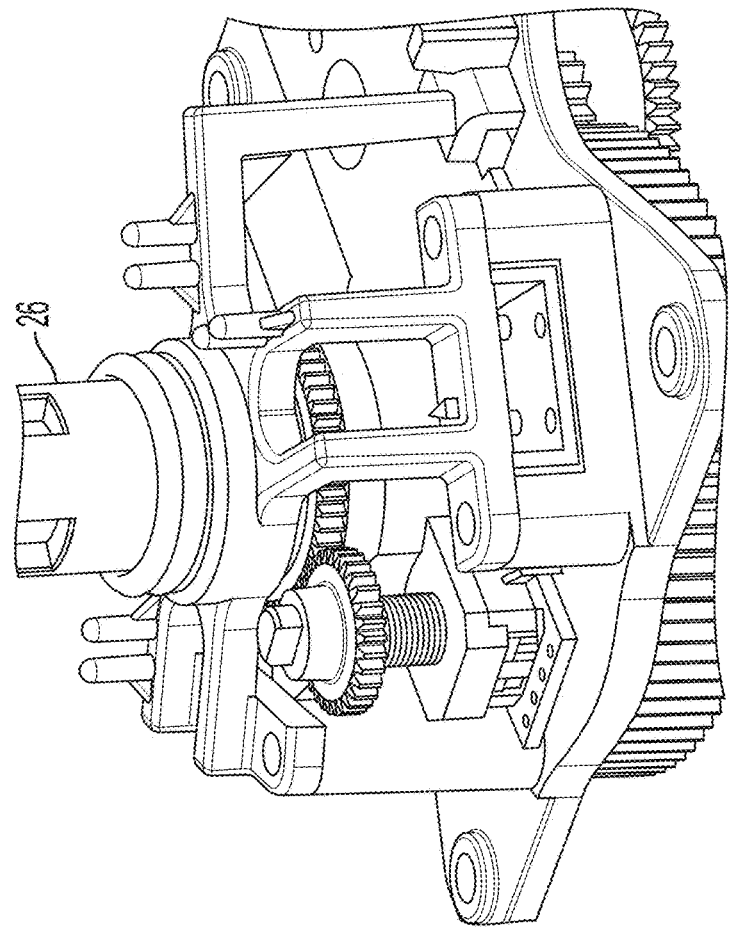
FIGS. 5-8 illustrate portions of an exemplary valve actuator including an encoder assembly.
Figure 5:
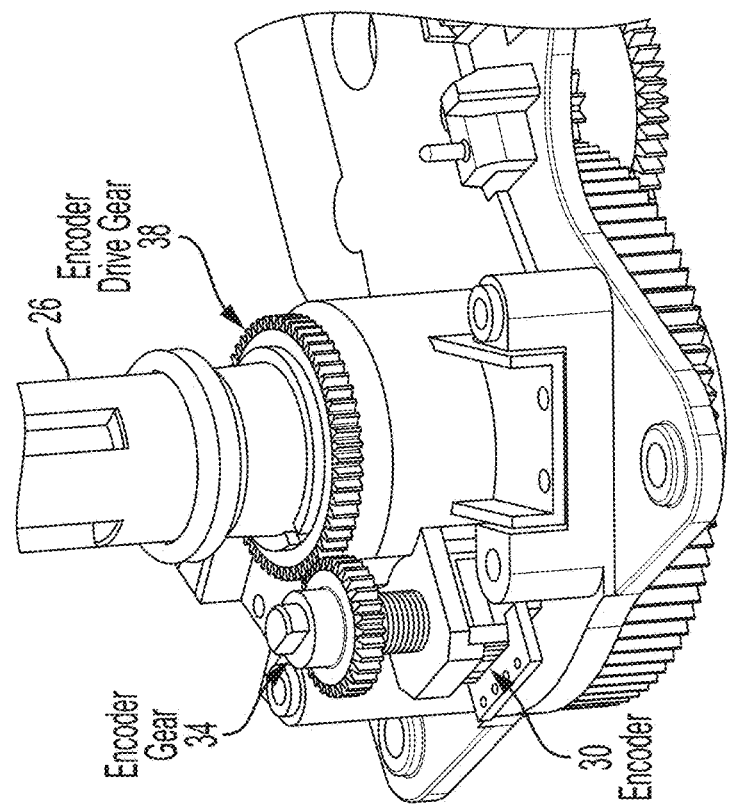
Figure 7:
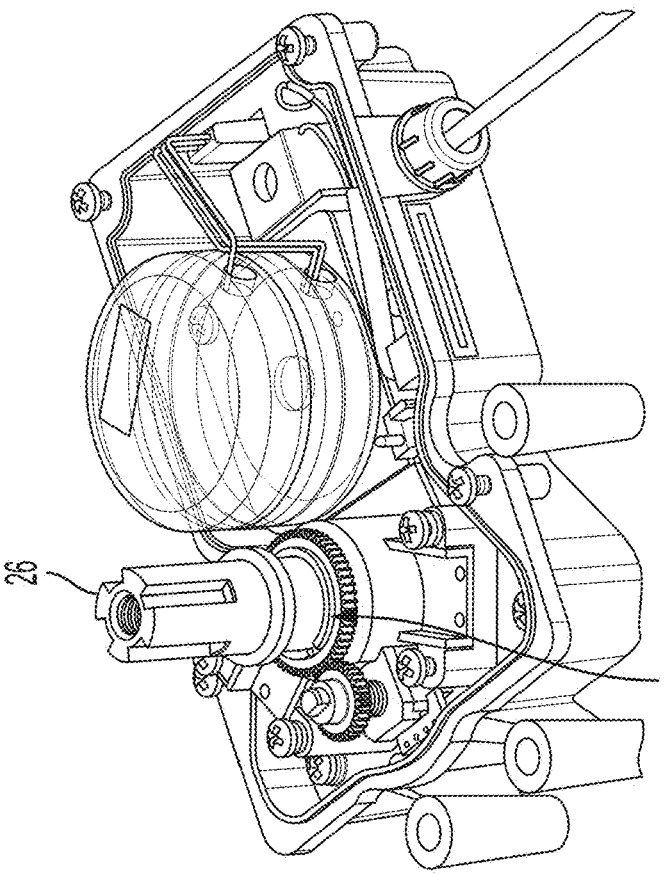
Figure 8:
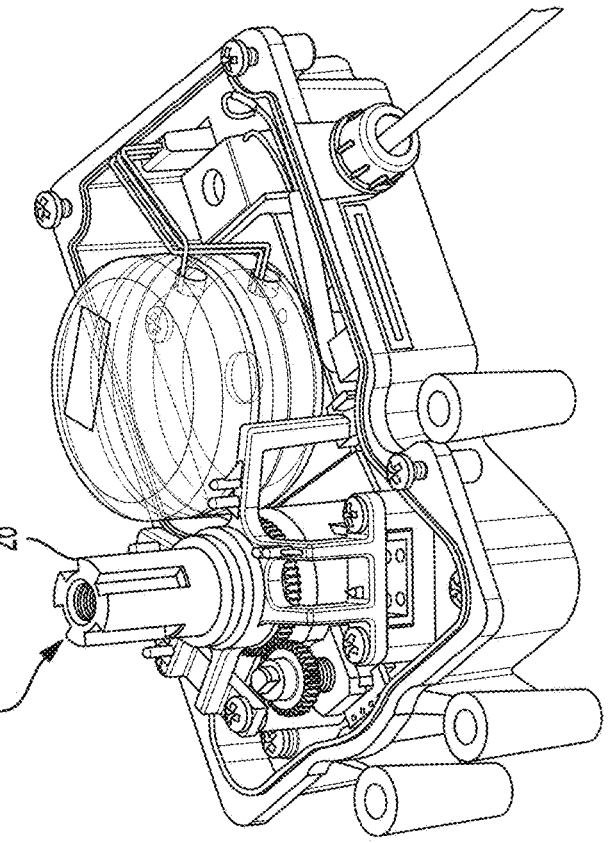

Shown in FIG. 4 is an actuator 10E, which need not have an antenna. Instead, one- or two-way wired communication with a controller may occur using cord 12D. At present, the RS-485 protocol is a preferred manner of transmitting and receiving signals via cord 12D. Also illustrated in FIG. 4 is cord 12C, which may connect actuator 10E to mains power or another suitable power source. If appropriate, any of actuators 10A-E may include an electrical transformer within its housing 22.

As noted above, actuators of the present invention need not necessarily be powered by a conventional power center. Alternating current (AC) or direct current (DC) power supplies may be used at any suitable voltages. The inventive actuators additionally may actuate dependent on the serial (or parallel), digital (or analog) commands received (via wires or wirelessly) from controller 18 or other appropriate device. Communication between an actuator of the invention and the controller may be bi-directional, thus allowing for the command architecture to be closed-loop instead of the open-loop architectures currently conventionally deployed. In this case, the actuator may act per the received commands provide direct feedback. By using this direct feedback mechanism, the controller may be able to determine the position of the valve associated with the actuator, among other parameters, in the event the actuator was repositioned manually by a user.

FIGS. 5-8 depict aspects of an exemplary valve actuator 10F. Shown in these figures are components of actuator 10F including shaft 26, encoder 30, encoder gear 34, and encoder drive gear 38. Shaft 26 may be configured to shift up or down, for example, to engage (or disengage from) a drive motor gear. In particular, such shifting to disengage from a drive motor gear can occur as a handle (e.g. handle 1 of FIGS. 1-4) or other portion of actuator 10 is moved manually.

Encoder drive gear 38 may be positioned on shaft 26. However, regardless of whether the shaft 38 is shifted up or down, encoder drive gear 38 may retain its position and maintain engagement with encoder gear 34. This approach allows encoder 30 to track the position of the handle (and therefore of the valve) regardless of whether the handle is moved manually or automatically.

Exemplary concepts or combinations of features of the invention may include:
A. An electronically-controlled valve actuator including a non-electronic indicator of valve position.
B. An electronically-controlled valve actuator including means for both (i) indicating valve position and (ii) allowing manual repositioning of the valve.
C. An electronically-controlled valve actuator comprising (i) a housing, (ii) an electrical transformer contained within the housing, (iii) a handle having at least a portion external to the housing, with the handle being both (a) directly or indirectly coupled to a valve controlled by the actuator and (b) operable manually, and (iv) means for communicating with a controller either wirelessly or via wire.
D. An electronically-controlled valve actuator comprising (i) a housing, (ii) a handle having at least a portion external to the housing, with the handle being both (a) directly or indirectly coupled to a valve controlled by the actuator and (b) operable manually, and (iii) means for tracking a position of the valve by tracking a position of the handle.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

Further, although applicant has described devices and techniques for use principally in connection with swimming pools, persons skilled in the relevant field will recognize that the present invention may be employed in connection with other objects and in other manners. Finally, references to "pools" and "swimming pools" herein may also refer to spas or other water containing vessels used for recreation or therapy and for which valve actuation is needed or desired.

What is claimed is:

1. An electronically-controlled valve actuator comprising:
(i) a housing,
(ii) a handle having at least a portion external to the housing, with the handle being both (a) directly or indirectly coupled to a valve controlled by the actuator and (b) operable manually,
(iii) a shifting shaft configured to shift between a first position and a second position, wherein the shifting shaft is rotatable about an axis, and
(iv) means for tracking a position of the valve by tracking a rotational position of the shifting shaft, wherein the means for tracking the position of the valve tracks the rotational position of the shifting shaft when the shifting shaft is in the first position and when the shifting shaft is in the second position, and wherein the means for tracking the position of the valve are at least partially on the shifting shaft, and wherein the means for tracking the position of the valve comprises an encoder drive gear positioned so as to rotate with the shifting shaft.

2. An electronically-controlled valve actuator according to claim 1 in which the encoder drive gear engages an encoder gear regardless of whether the shifting shaft is shifted into the first position or the second position.

3. An electronically-controlled valve actuator according to claim 1 in which, in the first position, the shifting shaft engages a drive motor gear, and in the second position, the shifting shaft disengages the drive motor gear.

4. An electronically-controlled valve actuator according to claim 3 in which manual operation of the handle shifts the shifting shaft to the second position.

5. An electronically-controlled valve actuator according to claim 1, wherein the means for tracking the position of the valve is within the housing.

6. An electronically-controlled valve actuator according to claim 1, wherein the means for tracking the position of the valve is directly engaged with the shifting shaft and is housed within the housing.

7. An electronically-controlled valve actuator comprising:
a. a housing;
b. a handle having at least a portion external to the housing, with the handle being both (i) directly or indirectly coupled to a valve controlled by the actuator and (ii) operable manually;
c. a shifting shaft configured to shift linearly between a first position and a second position, wherein the shifting shaft is rotatable about an axis;
d. an encoder drive gear positioned on the shifting shaft and configured to rotate with the shifting shaft; and
e. an encoder gear engaged by the encoder drive gear regardless of whether the shifting shaft is shifted linearly into the first position or the second position; and
in which, in the first position, the shifting shaft engages a drive motor gear, and in the second position, the shifting shaft disengages the drive motor gear; and
in which manual operation of the handle shifts the shifting shaft linearly to the second position.

8. An electronically-controlled valve actuator according to claim 7, wherein the encoder gear and the encoder drive gear are within the housing.

9. An electronically-controlled valve actuator according to claim 7, wherein the encoder gear is directly engaged with the encoder drive gear and is housed within the housing.

10. An electronically-controlled valve actuator comprising:
   a. a housing;
   b. a handle having at least a portion external to the housing, with the handle being both (i) directly or indirectly coupled to a valve controlled by the actuator and (ii) operable manually;
   c. a shifting shaft configured to shift between a first position and a second position, wherein the shifting shaft is rotatable about an axis;
   d. an encoder drive gear positioned on the shifting shaft and so as to rotate with the shifting shaft;
   e. an encoder gear engaged by the encoder drive gear regardless of whether the rotating shifting shaft is shifted linearly into the first position or the second position; and
   f. an encoder configured to track a position of the valve.

11. An electronically-controlled valve actuator according to claim 10, wherein the encoder gear is within the housing.

12. An electronically-controlled valve actuator according to claim 10, wherein the encoder gear is directly engaged with the encoder drive gear and is housed within the housing.

* * * * *